(No Model.)
F. H. BOLTE, T. A. DONLEVY & J. R. CONNELL.
VEHICLE WHEEL.
No. 558,930. Patented Apr. 28, 1896.
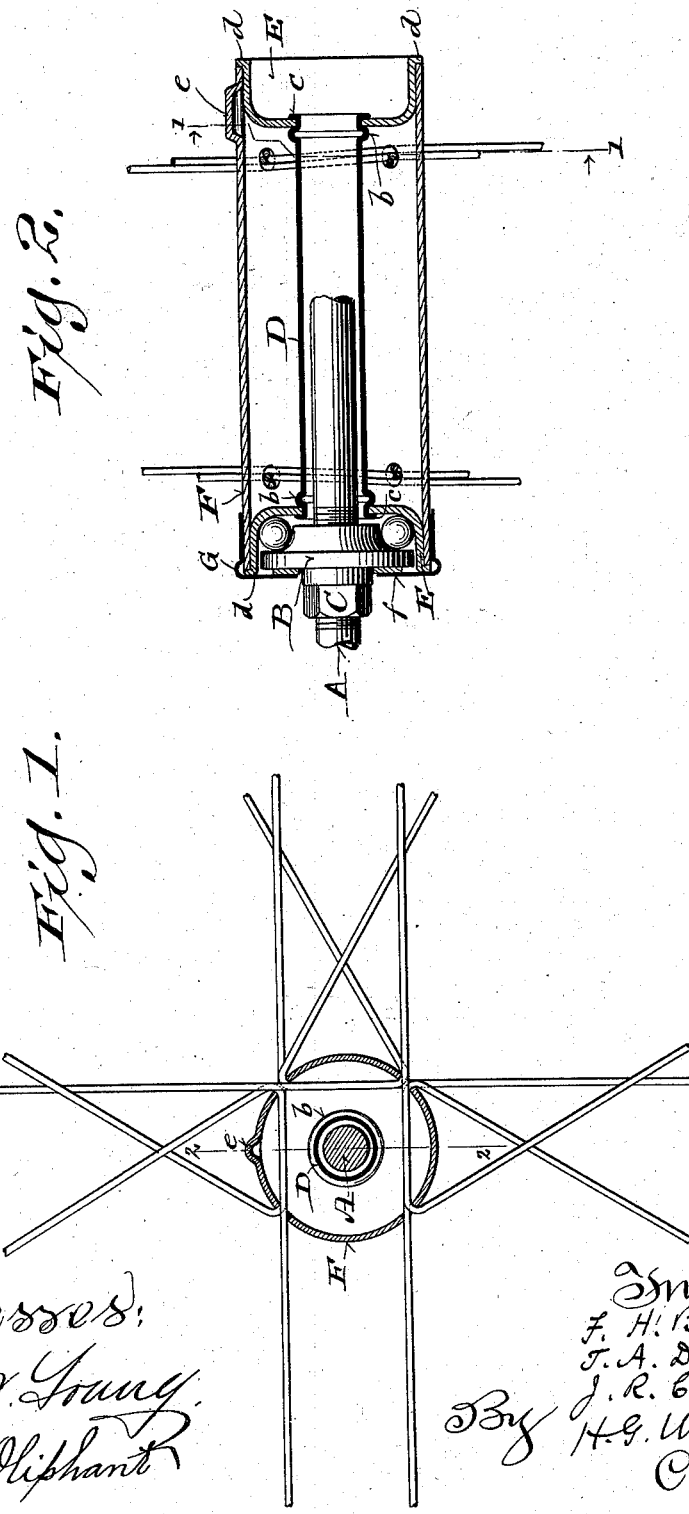
Witnesses:
Geo. W. Young.
N. E. Oliphant.
Inventors:
F. H. Bolte,
T. A. Donlevy,
J. R. Connell,
By H. G. Underwood

UNITED STATES PATENT OFFICE.

FRANK H. BOLTE, THOMAS A. DONLEVY, AND JAMES R. CONNELL, OF MILWAUKEE, WISCONSIN, ASSIGNORS TO THE BOLTE CYCLE MANUFACTURING COMPANY, OF SAME PLACE.

VEHICLE-WHEEL.

SPECIFICATION forming part of Letters Patent No. 558,930, dated April 28, 1896.

Application filed August 23, 1895. Serial No. 560,195. (No model.)

*To all whom it may concern:*

Be it known that we, FRANK H. BOLTE, THOMAS A. DONLEVY, and JAMES R. CONNELL, citizens of the United States, and residents of Milwaukee, in the county of Milwaukee and State of Wisconsin, have invented certain new and useful Improvements in Vehicle-Wheels; and we do hereby declare that the following is a full, clear, and exact description thereof.

Our invention has for its object to simplify, strengthen, and lighten the construction of wheels for bicycles and other vehicles, as well as to make the bearings for the same absolutely dust-proof; and it consists in the structural details hereinafter set forth with reference to the accompanying drawings, and subsequently claimed.

In the drawings, Figure 1 represents a view taken on the plane indicated by line 1 1 in the succeeding figure to clearly illustrate one of the important features of our invention. Fig. 2 represents a vertical longitudinal section taken on line 2 2 of the preceding figure to clearly illustrate other important features of our invention.

Referring by letter to the drawings, A represents a portion of an axle, such as is usual in connection with bicycle-wheels, B the adjustable ball-bearing cone in screw-thread engagement with the axle, and C the nut that serves to hold said cone in adjusted position.

Surrounding the axle is a tube D, having annular outwardly-extending beads $b$, against which ball-races E are set and secured in place by upsetting the ends $c$ of said tube. The ball-race corresponding to the ball-bearing cone B has a flange $d$, which impinges against one end of a barrel F, and the other end of the barrel is opposed by a flange on the other ball-race, as herein shown, it being understood that the aforesaid tube, ball-races, and barrel constitute a wheel-hub made in accordance with our invention.

For the rear wheel of a bicycle the barrel portion of the hub above specified may be provided with a key $e$, struck up therefrom, this key being for engagement with a corresponding seat in the small sprocket-wheel of the drive-gear pertaining to said bicycle.

In order to make the bearings dust-proof, we arrange dust-guards in the form of washers $f$, made from felt or other suitable material, against the outer sides of the ball-bearing cones and hold these washers in place by means of caps G, that slip onto the barrel F, above specified.

At a suitable distance inward from each end the barrel portion F of the wheel-hub is provided with an even number of radial openings equidistant apart, four in each series of these openings being deemed sufficient for all practical purposes, and to avoid sharp corners the edges of said openings are preferably rounded.

To spoke the wheel, we employ a series of wires, each of which is of sufficient length to constitute two spokes at an acute angle to each other and tangent to the axis of the hub. Each wire being primarily straight, it is run through two of the openings in the hub and then bent at one of these openings to form the two spokes at an acute angle to each other. The edges of the hub-openings being round, the bends $h$ of the wires do not oppose sharp corners, and we avoid crystallization of the metal in said wires. Consequently the liability of a spoke to break at the hub is reduced to a minimum.

The hub herein shown is for a thirty-two-spoke wheel. Therefore we employ sixteen wires, four of which extend through each hub-opening, but diverge outward therefrom in as many different directions, two of them being at right angles to each other and each of the remainder at an acute angle to the next adjacent of the former. It will also be seen that the spokes of least angle to the hub cross each other in pairs and individually cross or are crossed by two spokes of the greatest angle to said hub, whereby we increase the number of points at which the spokes may be tied and thus provide for a stiffer wheel than those of ordinary construction.

Having now fully described our invention, what we claim as new, and desire to secure by Letters Patent, is—

1. A wheel-hub comprising a tube, ball-races fast on the tube, and a spoke-barrel engaged by the ball-races.

2. A wheel-hub comprising a tube, ball-races fast on the tube, a spoke-barrel engaged by the ball-races, annular dust-guards that impinge against ball-bearing axle-cones engageable with said ball-races, and caps that slip on the ends of the spoke-barrel against the dust-guards.

3. A wheel-hub comprising a barrel provided adjacent to each end with an even number of radial openings equidistant apart, and a series of wires each of which engages two of said openings and is bent at one of the same to form two spokes at an acute angle to each other, there being four wires extending through each of said openings and diverged therefrom in as many different directions.

In testimony that we claim the foregoing we have hereunto set our hands, at Milwaukee, in the county of Milwaukee and State of Wisconsin, in the presence of two witnesses.

F. H. BOLTE.
T. A. DONLEVY.
J. R. CONNELL.

Witnesses:
N. E. OLIPHANT,
JOHN J. McGINN.